March 23, 1948. A. H. JESSEN 2,438,216
REVERSIBLE CLUTCHING MECHANISM
Filed Aug. 17, 1943 2 Sheets-Sheet 1
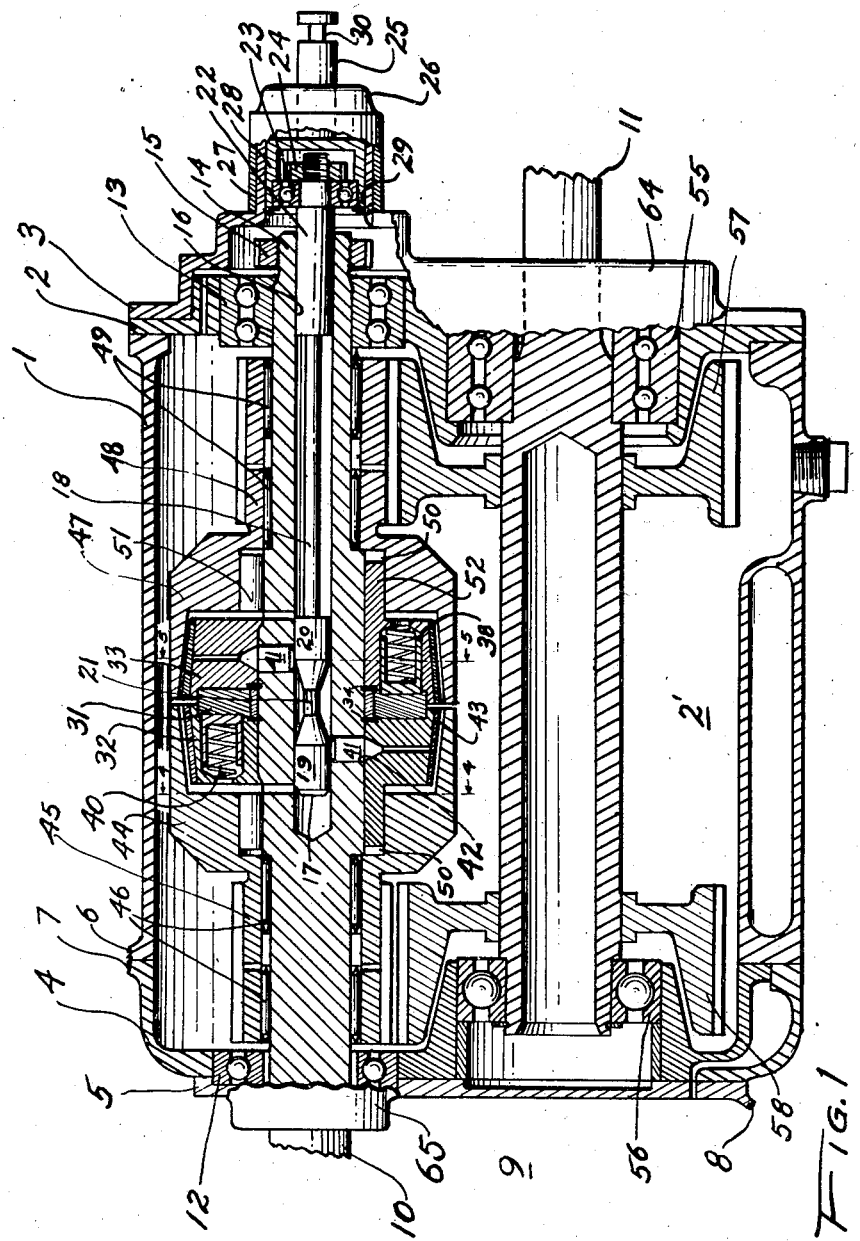
INVENTOR.
ARNOLD H. JESSEN
BY
Earl E Moore
ATTY.

March 23, 1948. A. H. JESSEN 2,438,216
REVERSIBLE CLUTCHING MECHANISM
Filed Aug. 17, 1943 2 Sheets-Sheet 2
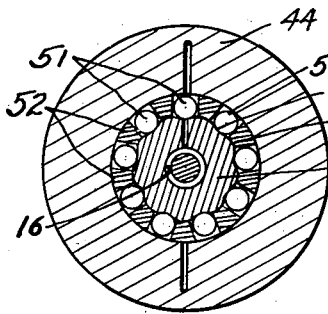
Fig. 4
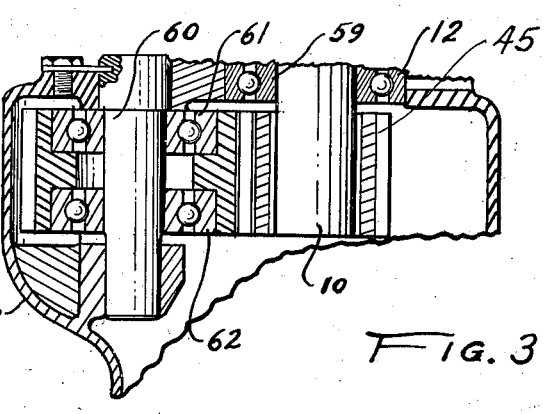
Fig. 3
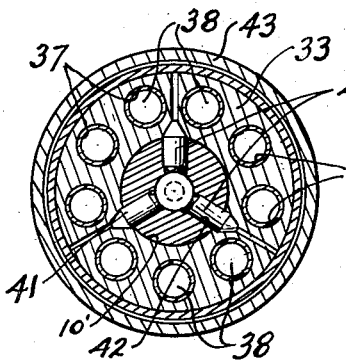
Fig. 5
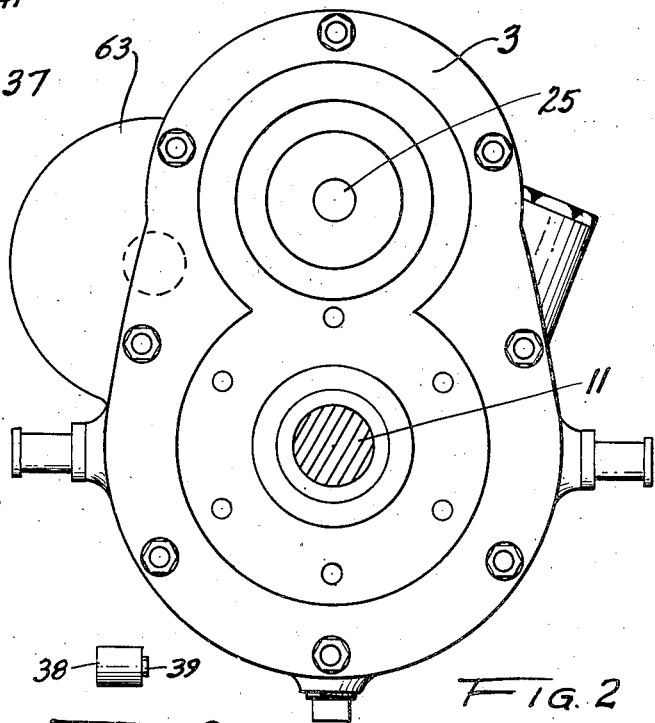
Fig. 2
Fig. 6
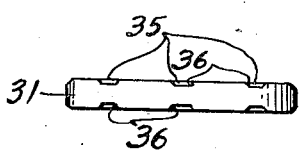
Fig. 7
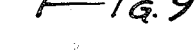
Fig. 9
Fig. 8
INVENTOR.
ARNOLD H. JESSEN
BY
ATTY.

Patented Mar. 23, 1948

2,438,216

UNITED STATES PATENT OFFICE 2,438,216

REVERSIBLE CLUTCHING MECHANISM

Arnold H. Jessen, Los Angeles, Calif.

Application August 17, 1943, Serial No. 498,932

10 Claims. (Cl. 74—377)

This invention is an enhancement over the invention revealed in applicant's Patent Number 2,289,019, issued July 7, 1942, and embodies some of the features disclosed therein.

The invention herein disclosed concerns means and methods for quietly and shocklessly transferring power from one shaft to another coupled with means for reversing the rotation of the driven shaft in a simple and practical manner. The flexibility and smooth running of such power transfer means is of utmost importance with present day machines regardless of the particular kind or type thereof. The invention comprises a unit suitable for insertion between any primary power delivery device and the thing to be driven, at any speed in forward direction or in reverse direction. The unit, for example, may be employed between the engine of an automobile and the transmission thereof, the drive shaft of the engine entering the unit at one point and a countershaft emerging at another for connection with the impeller shaft of the transmission, or the countershaft itself may be extended and used directly as the impeller shaft of the transmission mechanism.

The invention comprises a series of locking and releasing steps until the final locking step is accomplished, the means for carrying out the necessary steps embracing movable plungers, pawls, and rollers which transfer power at certain predetermined degrees of torque in a rapid but gentle procession, and the means for making such results possible may be built around the drive shaft of the unit or the countershaft of the unit, but it is preferred to build the means around the drive shaft for forward driving or reverse driving of the counter shaft.

One of the principal objects of this invention is to present a means and method for transferring power from one shaft to another with the least amount of shock and noise for forward and reverse operation of the driven shaft.

Another object is to provide a new and novel type of power transfer unit that is economical to make and manufacture, sturdy in construction, and dependable of operation under all practical uses.

Other objects, advantages and features of my invention will appear from the accompanying drawings, the subjoined detailed description, the preamble of these specifications and the appended claims.

Applicant is about to illustrate and describe one of the forms of his invention in order to teach one how to make and use the same, but it is to be understood that the drawings and description thereof are not to limit the invention in any sense whatsoever, except as limited by the appended claims.

In the drawings:

Fig. 1 is a vertical cross sectional view of the invention with parts being shown in elevation.

Fig. 2 is an end elevation of Fig. 1 as viewed from the right hand side thereof.

Fig. 3 is a horizontal sectional view of a portion of Fig. 1, showing an idler gear and its support.

Fig. 4 is a portion of Fig. 1 taken substantially along the line 4—4 thereof.

Fig. 5 is also a portion of Fig. 1 taken substantially along the line 5—5 thereof.

Fig. 6 is an elevational view of a spacer ring.

Fig. 7 is an inverted plan view of Fig. 6.

Fig. 8 is an elevational view of a plunger.

Fig. 9 is a plan view of Fig. 8.

The parts of this particular form of the invention are housed in a shell or casing comprising a central cylinder 1, supporting rear end frame 2, rear end cover 3, front supporting end frame 4, and front end cover 5. The top portions of the cylinder 1 and the front supporting frame, where they join, have extensions 6 and 7, respectively, and the lower portions of the front end cover has an extension 8; these extensions are shown as broken away, but they form a front chamber indicated at 9 for housing a fly wheel, starter equipment, etc., not shown, which are generally associated with engines and the like.

Extending through and across the top portion of the chamber 2' within the shell is a drive shaft 10 or an extension of the drive shaft of the flywheel in the front chamber 9. In the lower portion of the chamber 2' is a driven shaft or countershaft 11, this shaft usually being or connecting with the impeller shaft in the rearward end of the engine, not shown. Since the mechanism at the rearward and forward ends of the housing or shell form no part in this present invention, their showing or description is believed not necessary nor desired. This particular arrangement of the invention is combined and used with a marine engine, the shaft 10 leading to the forward engine through a fly wheel, and the shaft 11 leading to the propeller unit at the stern of a boat.

The drive shaft 10 is journalled at the front of the device by the ball bearing unit 12 and at the rear by the ball bearing unit 13, these units being securely supported in their respective supporting frames 4 and 2, as shown. The shaft 10 terminates in a reduced section 14 which is threaded and receives the lock nut 15. The shaft has an axial elongated bore 16 which provides a bearing surface for a control rod assembly 17. This rod assembly has the stem 18, enlarged guide or head portion comprising the spaced apart cam elements 19 and 20, and an intermediate reduced portion or low portion 21, the reduced portion rising from its ends at a predetermined angle of incline to merge with the peripheral surfaces of the elements 19 and 20, as shown. At the other end of the stem, is a guide head 22 which snugly rides in the bore 16, a portion thereof being reduced to receive the ball bearing unit 23, and another reduced portion that is threaded to receive the nut 24 for holding the bearing unit onto the end of the control rod. An extended rod 25 passes through a packing gland 26, which may be of any suitable type, and which gland is embodied in a cup-like cover 27 that snugly fits a reduced protruding portion of the front end cover plate 3. The inner end of this extended rod 25 is fixed to a cup-like coupler 28 which has an annular shoulder to engage the rear end of the bearing 23, the front end of the bearing being held fixed to the front end of the coupler by an expansion or snap ring 29, as shown. The other end of the extended rod is provided with a reduced portion 30 to be engaged by a shifting fork or any suitable mechanism for reciprocating the rod assembly 17 for the purposes to be later explained.

The central portion of the drive shaft 10 is serrated to provide a series of keyways 10' surrounding the shaft to accommodate registering keys 10'' upon the inner periphery of a centrally disposed spacer ring or flange-like element 31. Abutting frusto-conical drums 32 and 33 are positioned at the sides of the spacer ring. The spacer ring is held in axial position by side snap rings 34 which snugly fit into annular grooves about the shaft. The flange-like element or spacer ring 31, see Figs. 6 and 7, has a plurality of spaced apart radial recessed or pockets 35 with the edges thereof bevelled, as at 36. The drums on either side of the spacer ring, each have a circle of holes or bores 37 arranged in spaced relation with each other and designed to receive cylindrical plungers 38 as shown in Figs. 1 and 5. Each plunger has on its face a protruded portion or block 39 which is of the same configuration as the shape of the pockets 35 with sufficient clearance to allow the blocks to freely enter and exit their respective pockets. These plungers and integral blocks are each urged toward the spacer ring 31 by their respective compression springs 40 so that the blocks will always be in their respective pockets until the torque difference between the spacer ring and the drums 32 and 33 is great enough to cause the blocks to withdraw from their pockets and slide along and over the bevelled edges 36. Until this torque difference is great enough, the shaft 10, ring 31, and drums 32 and 33 turn together in synchronism.

The drums 32 and 33 are free for movement for a limited distance axially along the shaft 10 when unlocked by the pawls 41, these pawls having conical ends and slidable in their respective bores 42 which extend from the bore of the shaft into the drums, as illustrated. The outer peripheral surface of each drum is provided with a bronze or other suitable friction band 43 of even thickness and which is of frusto-conical shape.

The drum 32 is partly surrounded by a cup-like hub element 44 which is integral with the gear 45, the gear being journalled onto the shaft 10 for normal free wheeling thereon by the needle rollers 46. The drum 33 is partly enveloped by the cup-like hub element 47 which is integral with the gear 48, this gear also being supported upon the shaft by needle rollers as indicated at 49, and thus providing a normal free wheeling connection between the shaft and the gear.

Each hub 44 and 47, at a portion thereof about the shaft, is provided with an annular open chamber 50 which is concentric with the shaft and houses a plurality of rollers 51, these rollers being maintained in spaced relation with one another by a plurality of fingers or forks or the like 52, which are integral with and extend from their respective drums. At this point of the shaft, it is serrated to provide a series of spaced valleys 53 and hills 54 which blend into one another by gentle slopes so that the rollers 51 will become wedged between the slopes on either side and the inner periphery of the hubs to force the hubs to rotate with the shaft when certain torque conditions exist and which will be revealed later.

The driven shaft 11 in the lower part of the chamber 2' is journalled to the supporting frames 2 and 4 by the ball bearing members 55 and 56 respectively. Mounted upon and keyed to this shaft 11 are the gears 57 and 58, as shown, the gear 57 being in mesh with the gear 48, but the gear 58 is not in mesh with the gear 45 as these two gears are in mesh with an idler gear 59, see Fig. 3. The idler gear 59 is journalled on a short shaft 60 through the ball bearing members 61 and 62. By this arrangement, the shaft 11 is made to rotate in either direction depending upon whether the hub 44 or the hub 47 is in operation. The housing or shell bulge 63 protects the idler gear and its associated parts. At 64 and 65 are provided any suitable type of packing gland to keep the oil within the chamber 66 as this chamber is maintained substantially full of engine oil.

*Operation*

As shown in Fig. 1, the control rod 17 is positioned so as to place the drums 32 and 33 in a neutral relation with respect to the hubs 44 and 47, that is, the hubs are not rotating while the drive shaft 10 is rotating. Rotation of this shaft rotates the spacer ring 31 and the drums 32 and 33 since they are in mesh with the spacer ring because of the position of the plungers 38; these plungers always engaging the pockets 35 of the ring when there is not sufficient torque being transmitted to force the plungers from the pockets.

When the control rod 17 is shifted, for instance, to the right, the pawls 41 in the drum 33 will fall into the depression 21 of the shaft and free the drum 33 so that it can be shifted to the right by force of the compression springs 40 thereof; when this action takes place, the torque of the drum 33 is transferred to the hub 47 and hence the gears 48 and 57 and to the driven shaft 11. When the torque builds up sufficiently, the tongues of the plungers will slip from their pockets in the ring 31 and transfer all the torque to the hub 47 through the over-running rollers 51 which become wedged between the shaft 10 and the inner peripheral surfaces 50 of the hub 47. It takes a greater torque to accomplish this last action so as to assure a positive grip between the shaft and the hub 33.

The V-grooved disc 31, keyed to drive shaft, is for the purpose of eliminating the shock while engaging the line of torque from one speed to another. The grooves are so designed that when they reach their maximum capacity of torque, they will release the spring loaded cups 38 and are thus released from transmitting any further torque. From there on, the conical clutch drum shifts its full torque to the over-running clutch comprising the set of rollers 51 which are equally spaced between the forks 52 of the drum. This is necessary because it takes all the force of the drums to impinge the rollers between the drive and driven members. The line of torque transmitted from the drive shaft 10 to the synchronizing ring 31 is transferred to the spring loaded plungers slidable within drums. This combination is used as a synchronizing mechanism and is, therefore, only used up to about 150 foot pounds torque coupled to a 250 horsepower motor. At the time that it reaches its maximum torque it then releases its torque through the synchronizer ring and plungers. The conical clutch or drum then transfers its torque to the over-running roller clutch 51 which takes care of any overload.

When at a maximum torque, nearly all of the torque is released through the synchronizing disc. The cone clutch or drum then transmits its torque from the synchronizing disc to the over-running clutch lockup. This lockup is the result of the rollers 51 impinging upon the set of cams 53—54 associated with the drive shaft. These rollers act as a medium of locking the gears to the drive shaft. This is the third step and final locking process which takes care of any overload transmitted through the drums. The explanation of this, is that the synchronizing disc must first be released before the third step can be applied because it takes practically all the torque transmitted through the drum which is between 160 to 170 foot pounds to impinge the rollers between cam and hub because of the angle of the cam surface 53—54. This is necessary because if the cam would lock without the assistance of the drum, the rollers would not release when under a full load or full power of the motor. It is possible to release the over-running rollers by simply releasing the drum. This has been proved many times under severe tests. The drums are designed for a capacity of 150 foot pounds torque using a spring pressure of only 500 pounds.

The dual clutching mechanism may be better expressed as follows: As soon as the pawls 41 are released, the drum is shifted to bring its conical surface into frictional contact with the tapered surface of the hub 47. These two elements are, therefore, clutched together and the drum is turned slightly with the driven shaft 11. Torque is transmitted to the driven shaft 11, and that which is transmitted to the drum is sufficient to force the rollers 51 up one of the inclined sides of all the valleys 53, note Fig. 4, and thus become impinged or wedged so as to establish a locked driving relation between the shaft and the hub 47. This driving relation would not be possible without the first mentioned clutching action between the drum 33 and the hub 47. This is because the rollers 51 will not roll up the inclined sides of the valleys 53 in the shaft unless they are forced to climb by the torque transmitted to the drum. Without this torque transmission, the rollers will simply turn in their valleys unless the said inclined sides are but slightly inclined, in which case, they will probably roll up the inclined sides but will not roll back again and the shaft will not be unclutched or freed when the control rod 17 is operated to return the pawls 41 in their respective sockets of the drum 33. This dual clutching means is a necessary operation for the reason that one of the clutches serves to force the rollers up the inclined sides of their grooves and the other, to make the necessary driving relation between the torque drum 33 and the shaft.

To reverse the direction of the shaft 11, the control rod 17 is shifted to the left so that the gears 45, 59 and 58 are put into operation through the action of the pawls 41 and plungers 38 in the drum 32 and the wedging action of the rollers 51 within the hub 44. This method of transmitting power through either rotary direction of the driven shaft 11 eliminates all possible shock upon the forward and reversing mechanism automatically in a simple and dependable manner.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a device for securing a power transmitting element to its shaft, a shaft having a bore opening to one end thereof, a first element having means journalling it to the shaft, an annular chamber in the first element adjacent the shaft, a plurality of spaced apart rollers in the chamber, a plurality of shallow grooves alined around the shaft and open to the chamber, a second element concentric with the shaft and having extensions therefrom entering the chamber and between the rollers, means on the first and second elements for frictionally engaging one another, a pawl slidable radially in the shaft and exposed to the bore of the shaft and also partially slidable in a portion of the second element, means shiftable in the bore of the shaft for allowing the pawl to be moved to release the second element, and pressure means to shift the second element when free.

2. In a device for transmitting positive power comprising a shaft, and a pair of cooperating elements concentric with the shaft, said elements having tapered frictional contact so that one can rotate the other when shifted together, one of the elements consisting of a hub journalled on the shaft having an annular chamber with wedgeing-like means for gripping the shaft, and the other element consisting of a rotor with means extending therefrom in contact with the wedge-like means, means passing through the shaft for locking and unlocking the rotor to the shaft, and spring urged cup means constantly urging the rotor toward the hub for the purposes described.

3. In a device for transmitting power from one shaft to another in direct and in reverse direction, a shaft, a spacer ring on the shaft and concentric therewith, a clutch drum on each side of the ring and concentric with the shaft, plungers under pressure slidable in each drum and arranged in a circular path, a plurality of plunger pockets on each side of the ring and arranged in a circular path to register with the plunger path of the drums so as to receive end portions of the plungers for frictionally holding the drums and ring in synchronous rotation, pawl means in the shaft extending into their respective drums for latching and unlatching them with the shaft, a bevelled circumference on each drum, a hub unit for each drum having bevelled under surfaces for engaging the circumference of its respective drum when released, roller wedge-like locking means for each hub unit adjacent its shaft which operate to grip the shaft when in contact with its respective drum.

4. In a device for transmitting power from one shaft to another shaft, a disc-like element connected to one of the shafts having a plurality of open pockets on both sides thereof, a drum means adjacent to and coupled to the element when transmitting low torques and adapted to be shifted slightly along said one of the shafts, a hub unit adjacent the means and journalled on the said one of the shafts, said unit having an annular flange with under frictional surfaces for engaging a portion of the drum means when shifted, a plurality of roller locking means coacting between the unit and the said one of the shafts for causing positive wedge-like connection between the said one of the shafts and the unit when the unit is under high torque conditions.

5. The device recited in claim 4 wherein the unit and all the recited means thereof are positioned, as an operative set, at one side of the recited element, and a similar set positioned at the other side of the element having like connection with the said one of the shafts, and an exterior control device having means passing through the said one of the shafts with means for making contact with the drum means on both sides of the disc-like element.

6. In a device for transmitting power from a first shaft to a second shaft, a disc-like element connected to the first shaft, a drum means adjacent to and coupled to the element and adapted to be shifted axially along the first shaft, a hub unit adjacent the means and journalled on the first shaft, said unit having friction means for engaging a portion of the drum means, when shifted, and locking means coacting between the unit and the first shaft for causing positive wedge-like connection between it and the unit when the unit is under greater torque conditions when transferred from the drum means to the hub unit, and releasing mechanism for the drum means, and a control means passing axially through the first shaft to operate the mechanism so that when the control means is moved to a predetermined position, the mechanism releases the locking means for engagement with the hub unit.

7. In a device for transmitting power from one shaft to another shaft, a shaft, a disc-like element connected to the shaft, a drum means adjacent to and coupled to the element and adapted to be shifted axially along the shaft, a hub unit adjacent the means and journalled on the shaft, said unit having friction means for engaging a portion of the drum means, when shifted, locking means coacting between the unit and the shaft for causing positive wedge-like connection between it and the unit when the unit is under greater torque conditions when transferred from the drum means to the hub unit, the drum means including a body having its perimetrical surface bevelled and one side thereof provided with a circle of plungers urged toward the disc-like element, said element having a plurality of open pockets adapted to receive ends of the plungers so that the element and drum rotate in synchronism while the plungers are in their respective pockets.

8. The device recited in claim 7 wherein the shaft has a bore part way therethrough, shiftable means in the bore having connection means for locking and unlocking the roller for its shifting along the shaft to make contact with the hub.

9. In a device for transmitting power from one shaft to another shaft, a shaft, a disc-like element connected to the shaft, a drum means adjacent to and coupled to the element and adapted to be shifted axially along the shaft, a hub unit adjacent the means and journalled on the shaft, said unit having friction means for engaging a portion of the drum means, when shifted, locking means coaction between the unit and the shaft for causing positive wedge-like connection between it and the unit when the unit is under full load torque conditions when load is transferred from the drum means to the hub unit, the drum means comprising a disc having a tapered periphery and the hub unit having a tapered under surface so that said tapered periphery and surface grip one another when pressed into frictional contact, a plurality of spaced apart fingers extending from the drum means into an annular space between the unit and shaft, the shaft having surface serrations facing the annular space, said locking means comprising a plurality of rollers intermediate the unit and shaft which ride in the valleys of the serrations until impinged against parts of the serrations and the finger elements.

10. In a clutch mechanism adapted to operate a driven shaft in either direction, the mechanism including a drive shaft with a disc element keyed thereto and having radial grooves on both sides thereof, a pair of clutch drums on the drive shaft adapted to be set or released by manual control means, said drums being spaced from each other and surrounding a major portion of the disc element, a plurality of spring pressed cups in each drum which are continuously urged toward the disc element and adapted to enter the grooves thereof and place either one of the drums in synchronism with the disc element when the drive shaft is rotated and providing the control means is set in a predetermined position, a set of shiftable pawls in each drum which pass through portions of the drive shaft and which key or unkey each drum with the drive shaft, and a pair of spaced apart hubs with integral gears that are journalled on the drive shaft, each hub having a cup-like cavity which forms a chamber for the drums and disc element and has means for frictionally engaging its respective adjoining drum, each hub having an annular chamber surrounding the drive shaft which has an undulated wall, a plurality of free operable rollers in each hub chamber, a plurality of fingers extending from each drum and positioned between the rollers of its respective hub, either drum when released from the drive shaft transmitting the torque of the disc element to its respective hub to effect a primary lock-up of a fractional power delivery from the drive shaft to the gear of this particular hub, but upon increased torque transfer the rollers of the clutch hub are impinged between the drive shaft and the hub so as to effect a final lock-up and thus full power delivery from the drive shaft to the gear of the hub in action.

ARNOLD H. JESSEN.

REFERENCES CITED

The following references are of record in the file of this patent:

UNITED STATES PATENTS

| Number | Name | Date |
|---|---|---|
| 677,615 | Arnold | July 2, 1901 |
| 844,390 | Newton | Feb. 19, 1907 |
| 893,684 | Whitcomb | Mar. 30, 1908 |
| 1,003,156 | Snow | Sept. 12, 1911 |
| 1,007,139 | Penn | Oct. 31, 1911 |
| 1,043,290 | Banks | Nov. 5, 1912 |
| 1,414,622 | Carter | May 2, 1922 |
| 1,416,283 | Gmeinder | May 16, 1922 |
| 1,718,359 | Joseph | June 25, 1929 |
| 2,076,635 | Holstead | Apr. 13, 1937 |
| 2,245,815 | Peterson et al. | June 17, 1941 |
| 2,272,495 | Winger et al. | Feb. 10, 1942 |
| 2,335,926 | Fawick | Dec. 7, 1943 |

FOREIGN PATENTS

| Number | Country | Date |
|---|---|---|
| 122,065 | Great Britain | Jan. 16, 1919 |
| 593,616 | Germany | Mar. 1, 1934 |